United States Patent
Kondo

(10) Patent No.: US 6,794,853 B2
(45) Date of Patent: Sep. 21, 2004

(54) DISPLAY DEVICE FOR FUEL CELL VEHICLE AND FUEL CELL VEHICLE

(75) Inventor: Shugo Kondo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/349,406

(22) Filed: Jan. 21, 2003

(65) Prior Publication Data

US 2003/0137278 A1 Jul. 24, 2003

(30) Foreign Application Priority Data

Jan. 23, 2002 (JP) ........................................ 2002-014546

(51) Int. Cl.$^7$ ............................................. H01M 10/46

(52) U.S. Cl. ................. 320/132; 320/DIG. 18

(58) Field of Search ................................ 320/104, 132, 320/DIG. 18, DIG. 21; 340/635, 636.1

(56) References Cited

U.S. PATENT DOCUMENTS

| D378,500 S | * | 3/1997 | Nakai et al. ............... D10/125 |
| 5,798,702 A | * | 8/1998 | Okamoto et al. ......... 340/636.1 |
| 6,480,106 B1 | * | 11/2002 | Crombez et al. ........... 340/461 |
| 6,672,415 B1 | * | 1/2004 | Tabata ....................... 180/65.2 |

* cited by examiner

*Primary Examiner*—Edward H. Tso
(74) *Attorney, Agent, or Firm*—Merchant & Gould P.C.

(57) ABSTRACT

A display portion of a meter device of a fuel cell vehicle has a motor output meter and a capacitor capacitometer. The motor output meter has an output indicating portion and a regenerative power indicating portion. The output indicating portion indicates an output by the power of the fuel cell and an output by the power of the capacitor in different colors. The regenerative power indicating portion indicates a regenerative power of the motor in a different color from that indicated on the output indicating portion. The capacitor capacitometer indicates an amount corresponding to a power charged to the capacitor the residual capacity of the capacity in different colors.

5 Claims, 3 Drawing Sheets

DISPLAY DEVICE FOR FUEL CELL VEHICLE AND FUEL CELL VEHICLE

BACKGROUND OF THE INVENTION

1. Field of the Invention

The present invention relates to a display device for a fuel cell vehicle for displaying the power operating condition of the fuel cell vehicle provided with a power source in the form of a generator-motor powered by a fuel cell and a chargeable and dischargeable energy storage.

2. Description of the Related Art

In recent years, with a view to protecting the environment, the development of fuel cell vehicles has been in progress which are provided with a power source in the form of a motor powered mainly by a fuel cell. Further, among the fuel cell vehicles so developed, there are ones which are provided with a chargeable and dischargeable energy storage as an auxiliary power source.

With this energy storage, energy can be supplied to the motor to assist the driving of the same motor, for example, when the vehicle is accelerated, whereas when the vehicle is decelerated, regenerative power can be recovered.

With the fuel cell vehicles, however, since there are generated less noise and vibration from the nature thereof when compared with conventional vehicles powered by an internal combustion engine, there is caused a problem that the driver has difficulty in grasping the operating conditions of the power sources.

In particular, since the energy storage is not directly involved in the operation of the motor, even if the energy storage fails to function properly, there occurs no direct problem with the operation of the vehicle. On the other hand, in case the vehicle is kept running with the energy storage malfunctioning, there is caused a problem that the load applied to the fuel cell becomes large. Consequently, letting the driver be aware of the management status of lost and gained electric energy (energy management) becomes an important point for the fuel cell vehicles.

SUMMARY OF THE INVENTION

An object of the present invention is to provide a display device for a fuel cell vehicle provided with a power source in the form of a generator-motor powered by a fuel cell and a chargeable and dischargeable energy storage wherein the fuel cell and the energy storage are monitored at all times so as to facilitate the grasping of the energy management for the fuel cell vehicle.

With a view to solving the problems, according to a first aspect of the present invention, there is provided a display device (for example, a meter device 20 in an embodiment) for a fuel cell vehicle provided with a power source in the form of a generator-motor (for example, a motor 10 in the embodiment) powered by a fuel cell (for example, a fuel cell 2 in the embodiment) and a chargeable and dischargeable energy storage (for example, a capacitor 5 in the embodiment), the display device comprising an output meter (for example, a motor output meter 25 in the embodiment) of the generator-motor and a capacitometer (for example, a capacitor capacitometer 26 in the embodiment) of the energy storage.

According to the construction, the output of the generator-motor when it is driven and the residual capacity of the energy storage can be indicated in an interlocked fashion, whereby the output and the residual capacity can be monitored together.

According to a second aspect of the present invention, there is provided a display device for a fuel cell vehicle as set forth in the first aspect of the present invention, wherein the output meter indicates an output of the fuel cell and an output of the energy storage separately in different colors.

According to the construction, of the driving output of the generator-motor, a ratio between a portion occupied by the output by the power of the fuel cell and a portion occupied by the output by the power of the energy storage can be indicated separately.

According to a third aspect of the present invention, there is provided a display device for a fuel cell vehicle as set forth in the first or second aspect of the present invention, wherein the capacitometer indicates a regenerative power and a residual capacity of the energy storage separately in different colors.

According to the construction, a ratio between the regenerative power and the residual capacity of the energy storage can be indicated understandably.

Further, with a view to solving the problems, according to a fourth aspect of the present invention, there is provided a fuel cell vehicle comprising: a generator-motor as a power source which is powered by a fuel cell and a chargeable and dischargeable energy storage; and a display device having an output meter of said generator-motor and a capacitometer of said energy storage.

According to a fifth aspect of the present invention, there is provided a fuel cell vehicle as set forth in the fourth aspect of the present invention, wherein the output meter indicates an output of said fuel cell and an output of said energy storage separately in different colors.

According to a sixth aspect of the present invention, there is provided a fuel cell vehicle as set forth in the fourth aspect of the present invention, wherein the capacitometer indicates a regenerative power and a residual capacity of said energy storage separately in different colors.

DETAILED DESCRIPTION OF THE INVENTION

An embodiment of the present invention will be described below with reference to the accompanying drawings.

Figure 1:
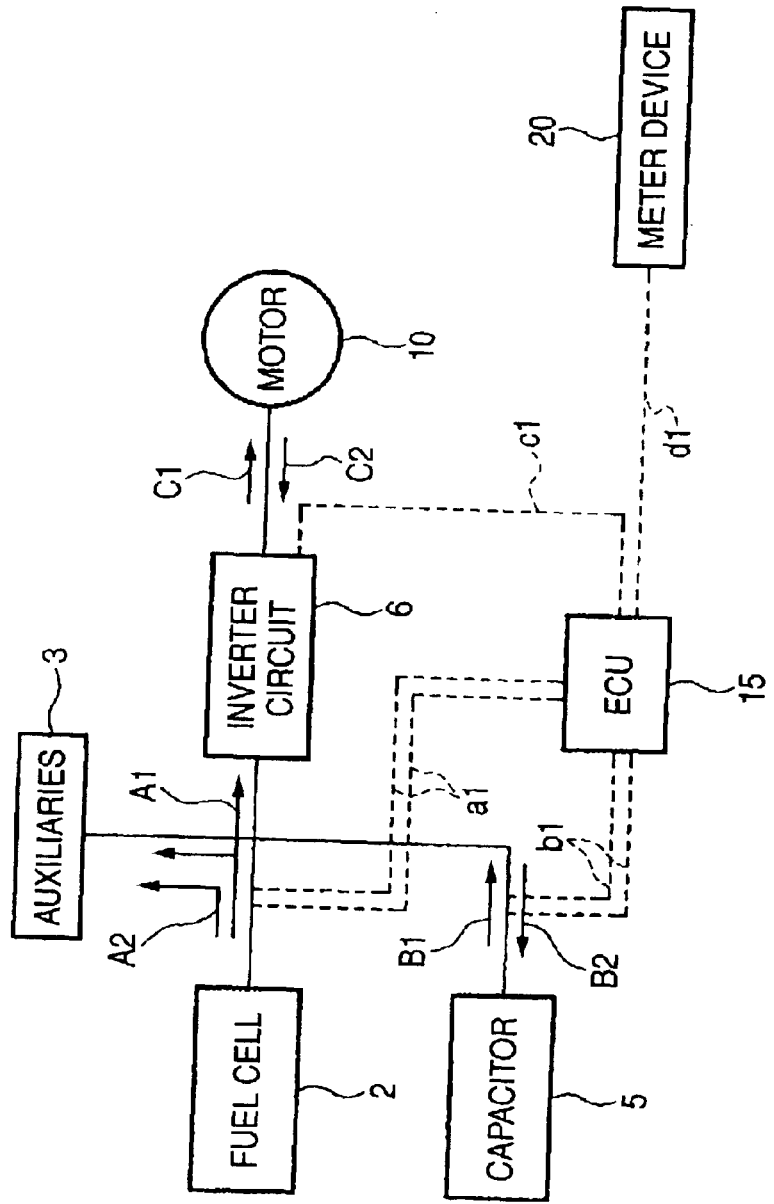
FIG. 1 is a schematic diagram showing the system configuration of a fuel cell vehicle according to an embodiment of the present invention.

FIG. 1 is a schematic diagram showing the system configuration of a fuel cell vehicle according to the present invention.

A motor 10 (a generator-motor) shown in the figure constitutes a power source of the vehicle and produces a rotational driving force when it is supplied with power mainly from a fuel cell 2 via an inverter circuit 6.

A capacitor 5 supplies the motor 10 with power together with the fuel cell 10, for example, when the vehicle is accelerated until the fuel cell 2 can generate power corresponding to an output request inputted into an ECU 15 to thereby assist the driving of the motor 10. Hereinafter, a condition in which the capacitor 5 assists the driving of the motor 10 will be simply referred to as when the vehicle is accelerated or at the time of accelerating the vehicle.

The motor 10 also functions as a generator which regenerates the kinetic energy of the vehicle which is being decelerated as power, for example, when the ECU 15 so determines based on the residual capacity of the capacitor 5.

The capacitor 5 recovers the regenerative power that is so regenerated by the motor 10 via the inverter circuit 6 to thereby maintain the residual capacity thereof within a prescribed range. Hereinafter, a condition in which the capacitor 5 recovers the regenerative power regenerated by the motor 10 will be simply referred to as at the time of regeneration during deceleration.

Note that in FIG. 1, power paths are indicated by solid lines, whereas detection and signal paths by broken lines.

The fuel cell 2 is constructed as a polymer electrolyte membrane fuel cell which uses, for example, hydrogen and oxygen as reaction gases and generates electricity through electrochemical reaction of the reaction gases.

In addition, the fuel cell 2 is connected to the motor 10 via the inverter circuit 6 which functions as an AC/DC converter, as well as to auxiliaries 3 of the vehicle. Note that power generated by the fuel cell 2 is indicated by an arrow A1 in the figure.

The capacitor 5 is a battery for supplying the motor 10 with power to assist the driving thereof when the fuel cell 2 is not in constant operation as just after the motor 10 is activated or when the vehicle is accelerated. While it has a small capacity, the capacitor 5 can be charged and discharged quickly.

In addition, as with the fuel cell 2, the capacitor 5 is also connected to the motor 10 via the inverter circuit 6. Note that power supplied from the capacitor 5 is indicated by an arrow B1 in the figure.

The motor 10 is constructed to be supplied with power (indicated by an arrow C1 in the figure) which is the total of power (A1) from the fuel cell 2 and power (B1) from the capacitor 5 via the inverter circuit 6 to generate the rotational driving force to thereby drive a vehicle drive shaft, not shown, which is connected to the motor 10 when the vehicle is accelerated.

In addition, the motor 10 outputs regenerative power through the rotation of a rotating shaft, not shown, by the vehicle drive shaft at the time of regeneration during deceleration. The regenerative power so regenerated is then charged to the capacitor 5 via the inverter circuit 6. Note that power charged to the capacitor 5 is indicated by an arrow B2 and power supplied to the auxiliaries 3 from the fuel cell 2 is indicated by an arrow A2 in the figure.

The ECU 15 controls the operation of the whole system and respective constituent components of the fuel cell vehicle. The ECU 15 outputs a control signal to the inverter circuit 6 via a path c1 based on an output request from an accelerator, not shown.

Information on electric current and voltage of power generated from the fuel cell 2 is inputted into the ECU 15 via a path a1 and information on electric current and voltage of power that is charged to and discharged from the capacitor 5 is inputted thereinto via a path b1.

Then, the ECU 15 outputs information mainly on the output of the motor 10, power generated by the fuel cell 2 and power charged to and discharged from the capacitor 5 to the meter device 20 for indication thereon via a path d1.

As with a meter installed on a conventional vehicle with an internal combustion engine, the meter device 20 is a device for indicating vehicle information through various types of meters and warning lamps.

A display portion 21 of the meter device 20 is disposed at a position such as a position in front of the driver's seat or a central position of an instrument panel which is easy to be recognized by the driver, and the driver can grasp the operating conditions of the vehicle and/or the power source thereof.

Figure 2:
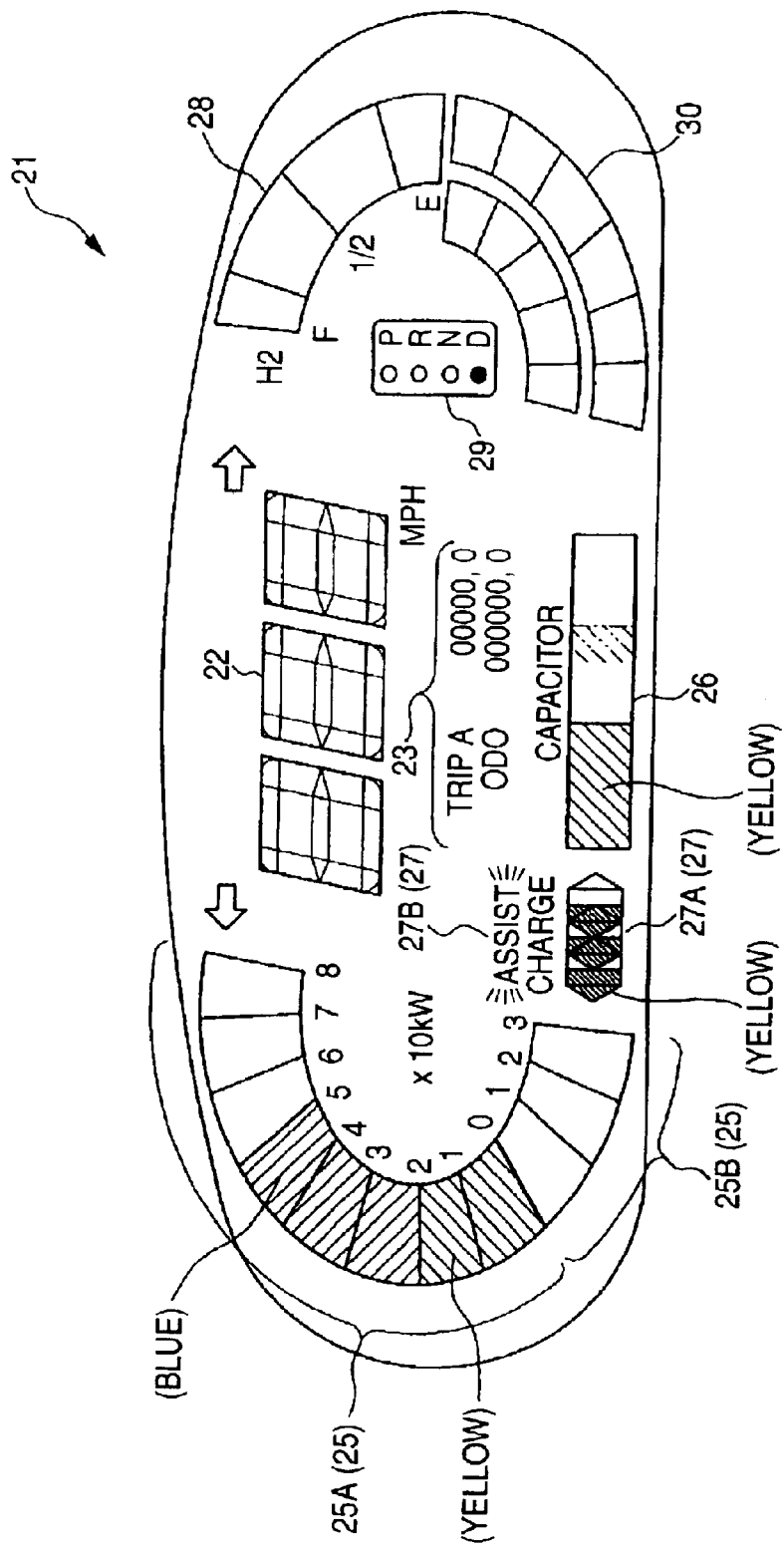
FIG. 2 is an explanatory diagram showing a display portion of a meter according the embodiment of the present invention when a vehicle is accelerated.
Figure 3:
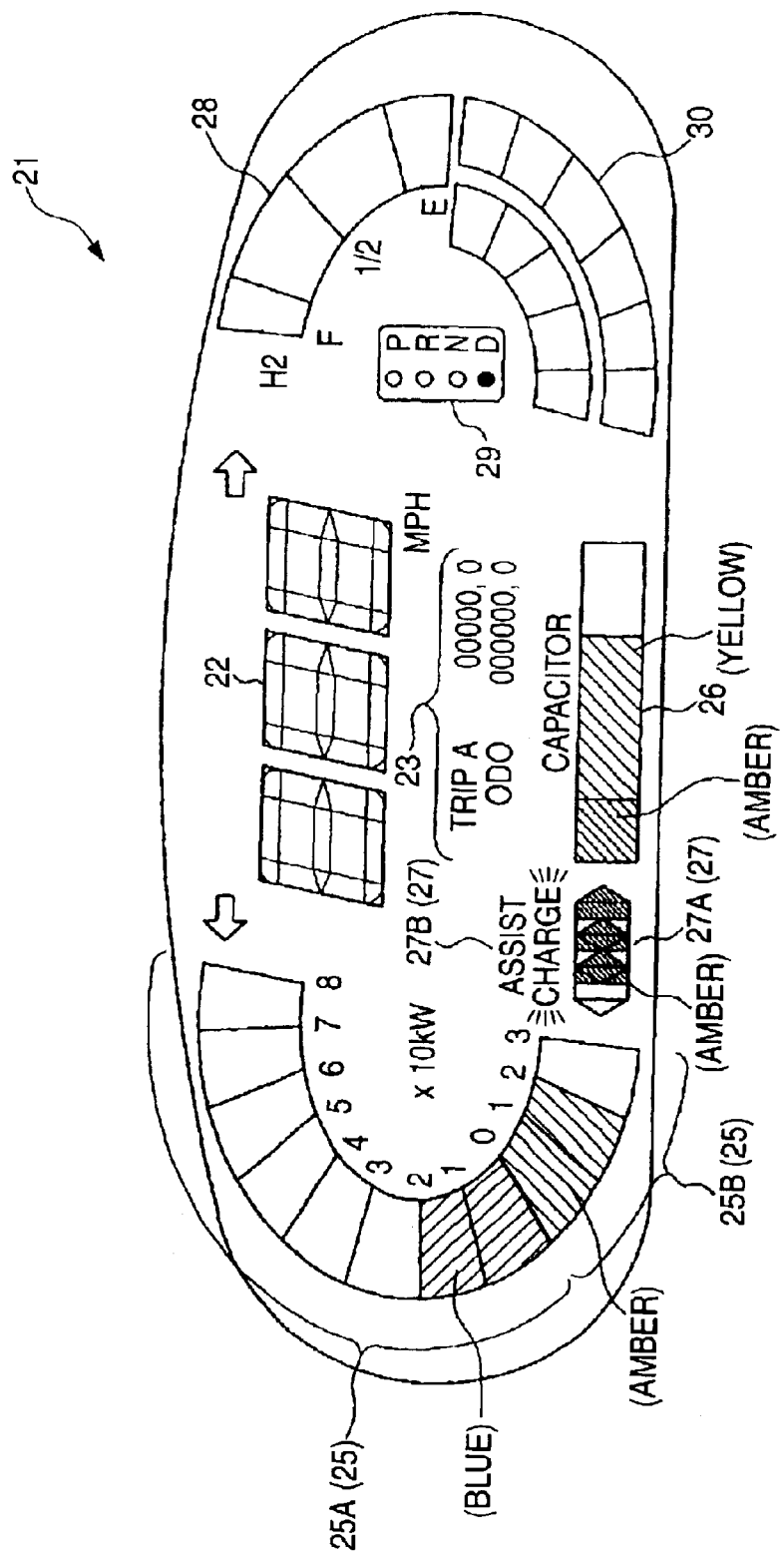
FIG. 3 is an explanatory diagram showing the display portion of the meter according to the embodiment of the present invention at the time of regeneration during deceleration.

FIG. 2 is an explanatory diagram showing the status of the display portion 21 at the time of accelerating the vehicle, and FIG. 3 is an explanatory diagram showing the status of the display portion 21 at the time of regeneration during deceleration.

As shown in the respective diagrams, the display portion 21 has a display surface of a substantially oval shape which is elongated in a transverse direction. An outwardly protruding arc-like motor output meter 25 (an output meter) is disposed at a left-hand side portion of the display portion 21.

An outwardly upwardly protruding arc-like fuel gas (hydrogen) volume meter 28 and various types of warning lamps 30 which are arranged in an outwardly downwardly protruding arc-like shape are disposed on a right-hand side portion of the display portion 21. A shift-position indicator lamp 29 is disposed inwardly of the fuel gas volume meter 28 and the warning lamps 30.

Disposed at a substantially central portion of the display portion 21 are an upper speedometer 22 and a lower odometer 23. Then, a capacitor capacitometer 26 (a capacitometer) adapted to be interlocked with the motor output meter 25 to indicate the residual capacity of the capacitor 5 is disposed at a position which is situated below the speedometer 22 and the odometer 23 and which meets a horizontal extension from a lower portion of the motor output meter 25.

Disposed between the lower portion of the motor output meter 25 and the capacitor capacitometer 26 is a capacitor charge/discharge indicator lamp 27 for indicating the charge and/or discharge condition of the capacitor 5.

The motor output meter 25 comprises an output indicating portion 25A for indicating the driving output of the motor 10 in a clockwise direction from a zero point as a reference and a regenerative power indicating portion 25B for indicating the regenerative power of the motor in a counterclockwise direction. Note that the zero point is disposed closer to the lower portion of the motor output meter 25.

Here, the output indicating portion 25A indicates an output by the power of the fuel cell 2 and an output by the power of the capacitor 5 in different colors in such a manner that the former is indicated in, for example, blue and the latter in, for example, yellow. In addition, the regenerative power indicating portion 25B indicates the regenerative power of the motor 10 in, for example, amber.

The capacitor capacitometer 26 indicates the residual capacity of the capacitor 5 in a bar graph which extends from the left (which is a side where the motor output meter 25 is disposed) to the right. Here, the capacitor capacitometer 26 is constructed to indicate the residual capacity of the capacitor 5 in different colors such as in yellow (which is the same color as that of the output indicating portion 25a which indicates the output of the capacitor 5) and amber (which is the same color as that of the regenerative power indicating portion 25B which indicates regenerative power).

The capacitor charge/discharge indicator lamp 27 comprises an arrow portion 27A for indicating the charging or discharge condition of the capacitor 5 in directions and a character portion 27B for indicating the charging or discharging condition of the capacitor 5 in characters.

Here, the arrow portion 27A is constructed to be switched over for display between an arrow shape colored in yellow (which is the same color as that of the output indicating portion 25A which indicates the output of the capacitor 5) and directed from the right (the capacitor capacitometer 26) to the left (the motor output meter 25) and an arrow shape colored in amber (which is the same color as that of the regenerative power indicating portion 25B which indicates regenerative power) and directed from the left to the right. In addition, the character portion 27B is constructed to be switched over for display between a character indication (for example, ASSIST) which indicates in yellow (which is the same color as that of the output indicating portion 25A which indicates the output of the capacitor 5) that a drive assist is being applied and a character indication (for example, CHARGE) which indicates in amber (which is the same color as that of the regenerative power indicating portion 25B which indicates regenerative power) that the capacitor 5 is being charged.

Next, the function will be described.

Firstly, an output request is inputted into the ECU 15 when the driver operates the accelerator pedal, not shown, and the ECU 15 determines from the output request that the vehicle be accelerated as with the aforesaid time of accelerating the vehicle.

When the vehicle is accelerated, as shown in FIG. 2, the meter device 20 indicates separately the output by the power of the fuel cell 2 and the output by the power of capacitor 5 in different colors in the output indicating portion 25A of the motor output meter 25, specifically indicating, for example, the former in blue and the latter in yellow based upon indicating information inputted from the ECU 15.

In addition, by interlocking the capacitor capacitometer 26 with the motor output meter 25, the meter device 20 indicates the residual capacity of the capacitor 5 in the capacitor capacitometer 26 by subtracting an amount corresponding to a power that is consumed to assist the driving of the motor 10 from the residual capacity indication of the capacitor capacitometer 26.

Furthermore, by interlocking the capacitor recharge/discharge indicator lamp 27 with the motor output meter 25, the arrow portion 27A is indicated in, for example, a blue arrow shape directed from the capacitor capacitometer 26 to the motor output meter 25, while the character portion 27B is indicated in, for example, a yellow character indication (for example, ASSIST) indicating the drive assist being applied.

When the aforesaid vehicle accelerating condition is shifted to a condition in which the fuel cell 2 generates power corresponding to the output request (or a constant driving condition results), the power supply from the capacitor 5 is stopped.

As this occurs, the driving output of the motor 10 indicated in the output indicating portion 25A of the motor output meter 25 is totally constituted by the output by the power of the fuel cell 2, and the output indication portion 25A is indicated totally in, for example, blue (a figure thereof being omitted).

When the driver releases the accelerator pedal from the constant driving condition, the power supply from the fuel cell to the motor 10 is stopped, and a braking force is applied to the vehicle drive shaft due to the rotational resistance of the motor 10, this starting to decelerate the vehicle. When the vehicle is decelerated like this, the ECU 15 determines that the aforesaid time of regeneration during deceleration should occur.

At the time of regeneration during deceleration, as shown in FIG. 3, the meter device 20 indicates the regenerative power of the motor 10 in the regenerative power indicating portion 25B of the motor output meter 25 in a different color from that indicated on the output indicating portion 25A such as amber based upon indicating information inputted from the ECU 15. Note that an output indicated in blue in the output indicating portion 25A is power (indicated by the arrow A2 in FIG. 1) supplied from the fuel cell 2 to the auxiliaries 3.

In addition, by interlocking the capacitor capacitometer 26 with the motor output meter 25, the meter 2 indicates an amount corresponding to a power charged to the capacitor 5 via the inverter circuit 6 as an addition to the residual capacity indication of the capacitor capacitometer 26. This added amount is indicated separately in a different color from that indicating the residual capacity of the capacitor capacitometer 26 such as amber.

Furthermore, by interlocking the capacitor recharge/discharge indicator lamp 27 with the motor output meter 25, the arrow portion 27A is indicated in, for example, an amber arrow shape directed from the motor output meter 25 to the capacitor capacitometer 26, while the character portion 27B is indicated in, for example, an amber character indication (for example, CHARGE) indicating that the capacitor 5 is being charged.

When the regenerative charging is completed, the residual capacity of the capacitor capacitometer 26 is indicated totally in the same color (for example, in yellow) including the increased amount, whereby the residual capacity can be maintained within the prescribed range.

According to the embodiment, at the time of accelerating the vehicle, since the driving output of the motor 10 indicated in the motor output meter 25 of the meter device 20 is indicated by the output by the power of the fuel cell 2 and the output by the power of the capacitor 5 which are indicated separately in different colors and the residual capacity in the capacitor capacitometer 26 is indicated as being reduced in an interlocked fashion with the indication of the output by the power of the capacitor 5, the driver can easily grasp at a glance the power consumption status of the capacitor 5 and the change in residual capacity of the capacitor 5 due to consumption of the power thereof.

Furthermore, since the capacitor recharge/discharge indicator lamp 27 indicates the power consumption status of the capacitor 5 by the arrow and characters whose colors are the same as that indicating the residual capacity of the capacitor 5, the driver can easily recognize the power consumption status of the capacitor 5.

In addition, at the time of regenerating power during deceleration, since the regenerative power indicated in the regenerative power indicating portion 25B of the meter device 20 is indicated in the different color from that of the output indication of the output indicating portion 25A and the indication of the residual capacity of the capacitor capacitometer 26 interlocks with the indication of regenerative power, whereby an amount added to the residual capacity of the capacitor 5 during regeneration is indicated separately in the different color from that indicating the residual capacity of the capacitor 5, the driver can easily grasp at a glance the charged condition of the capacitor 5 and the change in residual capacity of the capacitor 5 by virtue of charging.

Furthermore, since the capacitor charge/discharge indicator lamp 27 indicates the charged condition of the capacitor 5 by the arrows and characters whose colors are the same as that indicating the regenerative power, the driver can easily recognize the charged condition of the capacitor 5.

Note that the present invention is not limited to the above embodiment, and for example, the form of the display portion 21 described above is only one of forms and may be altered depending on vehicles. In addition, adopted as the display method of the display portion 21 can be various display methods including a head-up display in which a display is projected on the windscreen.

In addition, the combination of colors used for indicating the output, regenerative power and residual capacity is only one of examples, and any combination of colors may be used provided that it facilitates the recognition by the driver.

Furthermore, as to the arrow portion 27A of the capacitor charge/discharge indicator lamp 27, for example, an indicating method used for the direction indicator lamps of an automobile may be used provided that the charged condition can be indicated. In addition, the indication by characters of the character portion 27B is only one of examples and may be freely combined with the indicating method of the arrow portion 27A.

Then, while the embodiment has been described as the capacitor being used as the chargeable and dischargeable energy storage, various types of batteries may be used.

As has been described heretofore, according to the first aspect of the present invention, since the output of the generator-motor when it is driven and the residual capacity of the energy storage can be monitored together by indicating them in an interlocked fashion, the driver can easily grasp at a glance, in particular, the change in energy at the energy storage, and there can be provided an advantage that the driver can be warned to adjust the driving of the vehicle in line with the change in energy so grasped.

According to the second aspect of the present invention, in addition to the advantage provided by the first aspect of the present invention, since of the driving outputs of the generator-motor, a portion occupied by the output by the power of the fuel cell and a portion occupied by the output by the power of the energy storage can be separately indicated, there can be provided an advantage that the driver can easily grasp at a glance the energy consumption status of the energy storage above all.

According to the third aspect of the present invention, in addition to the advantage provided by the first or second aspect of the present invention, since the ratio of the regenerative power and the residual capacity of the energy storage can easily be indicated, there can be provided an advantage that the driver can easily grasp at a glance the charging status of regenerated energy of the energy storage above all.

What is claimed is:

1. A display device for a fuel cell vehicle provided with as a power source a generator-motor powered by a fuel cell and a chargeable and dischargeable energy storage, said display device comprising:

an output meter of said generator-motor, wherein the output meter indicates an output of said fuel cell and an output of said energy storage separately in different colors; and a capacitometer of said energy storage.

2. A display device for a fuel cell vehicle as set forth in claim 1, wherein the capacitometer indicates a regenerative power and a residual capacity of said energy storage separately in different colors.

3. A fuel cell vehicle comprising:

a generator-motor as a power source which is powered by a fuel cell and a chargeable and dischargeable energy storage; and a display device having an output meter of said generator-motor and a capacitometer of said energy storage, wherein the output meter indicates an output of said fuel cell and an output of storage separately in different colors.

4. A display device for a fuel cell vehicle provided with as a power source a generator-motor powered by a fuel cell and a chargeable and dischargeable energy storage, said display device comprising:

an output meter of said generator-motor; and a capacitometer of said energy storage, wherein the capacitometer indicates a regenerative power and a residual capacity of said energy storage separately in different colors.

5. A fuel cell vehicle comprising:

a generator-motor as a power source which is powered by a fuel cell and a chargeable and dischargeable energy storage; and a display device having an output meter of said generator-motor and a capacitometer of said energy storage, wherein the capacitometer indicates a regenerative power and a residual capacity of said energy storage separately in different colors.

* * * * *